United States Patent [19]
Beard

[11] Patent Number: 5,838,471
[45] Date of Patent: Nov. 17, 1998

[54] INFRARED ECHO CANCELING

[75] Inventor: Paul Beard, Milpitas, Calif.

[73] Assignee: Norand Corporation, Cedar Rapids, Iowa

[21] Appl. No.: 671,565

[22] Filed: Jun. 27, 1996

Related U.S. Application Data

[60] Provisional application No. 60/000,539 Jun. 27, 1995.

[51] Int. Cl.[6] .................................................. H04B 10/00
[52] U.S. Cl. ......................... 359/153; 359/110; 359/111; 370/286
[58] Field of Search ........................... 359/110–111, 113, 359/153, 161, 172; 370/286, 289; 379/406, 410; 375/222, 219, 346

[56] References Cited

U.S. PATENT DOCUMENTS

| | | | |
|---|---|---|---|
| 5,043,976 | 8/1991 | Abiven et al. ........................... | 359/110 |
| 5,557,634 | 9/1996 | Balasubramanian et al. .......... | 375/222 |
| 5,596,439 | 1/1997 | Dankberg et al. ...................... | 359/161 |

OTHER PUBLICATIONS

Title: IBM Announces IRDA Chips for OEMS Place of Publication: First! Your Story Request Jun. 26, 1996.
Author: Michael Moeller Title: Handhelds Tout Lithium–Ion Batter, Big Displays Date: Jun. 5, 1995 Place of Publication: PC Week, v12, n22.
Author Keming W. Yeh Title: IrDA's Next Hurtle: Total Interoperability Date: Apr. 17, 1995 Place of Publication: Electronic Design, v43, n8.
Author: Bill Travis Title: Ease File Transfers with IrDA–Protocol Wireless Infrared Date: Mar. 30, 1995 Place of Publication: EDN, v40, n7.
Author: Jim Symour Title: IR: Fast, CHeap, and Soon Ubiquitous Date: Feb. 7, 1995 Place of Publication : PC Magazine, v14, n3.
Title HP and Microsoft to Develop Infrared Communications Solutions for Microsoft'Window 95 Operating System Date: Dec. 12, 1994 Place of Publication: Business Wire.

*Primary Examiner*—Kinfe-Michael Negash
*Attorney, Agent, or Firm*—Suiter & Associates PC

[57] ABSTRACT

An infrared data communications system employs echo cancellation to remove echo signals of infrared transmissions received by an infrared receiver transducer. A version of the data pulse signal to be transmitted is subtractively combined with the received data pulse signal in order to remove echos of the transmitted signal from the received data pulse signal. A pulse stretcher circuit is utilized to increase the pulse width duration of the version of the data pulse signal to be combined with the received data pulse signal in order to ensure correct timing and cancellation of received echo signals over a range of echo signal propagation delay time.

8 Claims, 9 Drawing Sheets

INFRARED ECHO CANCELING

CROSS-REFERENCE TO RELATED APPLICATIONS

The present application claims the benefit under 35 U.S.C. § 119 of U.S. Provisional Application Ser. No. 60/000,539 filed Jun. 27, 1995. Said Provisional Application Ser. No. 60/000,539 is hereby incorporated herein by reference in its entirety.

TECHNICAL FIELD

The present invention relates generally to echo canceling in infrared data communications systems and specifically to canceling infrared echo signals in hand-held portable data terminals utilizing infrared data communications.

BACKGROUND OF THE INVENTION

Hand-held portable data terminals are widely utilized for collecting, processing, storing and transferring data in a variety of applications. The need for portable data collection terminals is ever increasing as the amount of information required to be collected and processed in the modern business world grows exponentially. The applications of portable data collection terminals and data acquisition systems continuously multiply as businesses demand greater ability to meet data collection and processing needs.

As a result of increased data processing needs, demand has been raised for a more powerful and more versatile data collection terminal capable of receiving and sending data in a multitude of data transfer modes. Vast amounts of information must be rapidly and efficiently collected, processed and transmitted to the proper destination. Business decisions of far reaching impact are most preferably based upon real time information. The capabilities of the data collection terminal must be relied upon to acquire and communicate such vital information.

Hand-held portable data terminals often utilize infrared transmissions for data communications. Infrared systems communicate using transmissions having wavelengths slightly longer than the wavelengths of visible light. Because infrared transmissions travel in straight, line-of-sight paths, infrared data communications is often utilized for short hop direct communications links. Such short hop communications links provide convenient, efficient and inexpensive data transfer such as file transferring or printing. Short hop infrared communications links are often required in wireless local area networks having roaming data terminals which allow for continuous access to business information.

An artifact of infrared communications is the high reflectivity of hard, flat surfaces to infrared waves causing echos of the transmitted infrared data signal to appear at and be received by the transmitting device thereby interfering with communications. Two-way (or full duplex) infrared communications exacerbates the echo problem because reflections of the transmitted data signal are picked up by the receiver of the transmitting unit which are often difficult to discern from an actual incoming data transmission.

During infrared data transmission every byte transmitted may also be received at the receiver of the transmitting unit causing an interrupt of the data reception process. The system processor is required to service the interrupt in order to determine whether the received byte was the same as the byte of data that was recently transmitted. If the byte was recently transmitted then that byte must be ignored and discarded. This interrupt management process is tedious, expends processing power and often fails to discriminate between an echo of the transmitted data signal and a genuine incoming data signal.

SUMMARY OF THE INVENTION

The present invention provides cancellation of echos of the transmitted infrared signal from the received data signal present at the receiver in a hand-held portable data terminal. The transmitted infrared data signal is subtractively combined with the received infrared data signal of the transmitting unit's receiver in order to remove any transmitted signal echos which may have been received by the infrared receiver and present in the received infrared data signal. Additionally, a pulse stretcher circuit is utilized to increase the period of the canceling signal in order to ensure proper canceling timing and complete cancellation of received echo signals over a range of echo signal propagation delay times.

BRIEF DESCRIPTION OF THE DRAWINGS

The numerous objects and advantages of the present invention may be better understood by those skilled in the art by reference to the accompanying figures in which.

DETAILED DESCRIPTION OF AN EXEMPLARY EMBODIMENT

Figure 1:
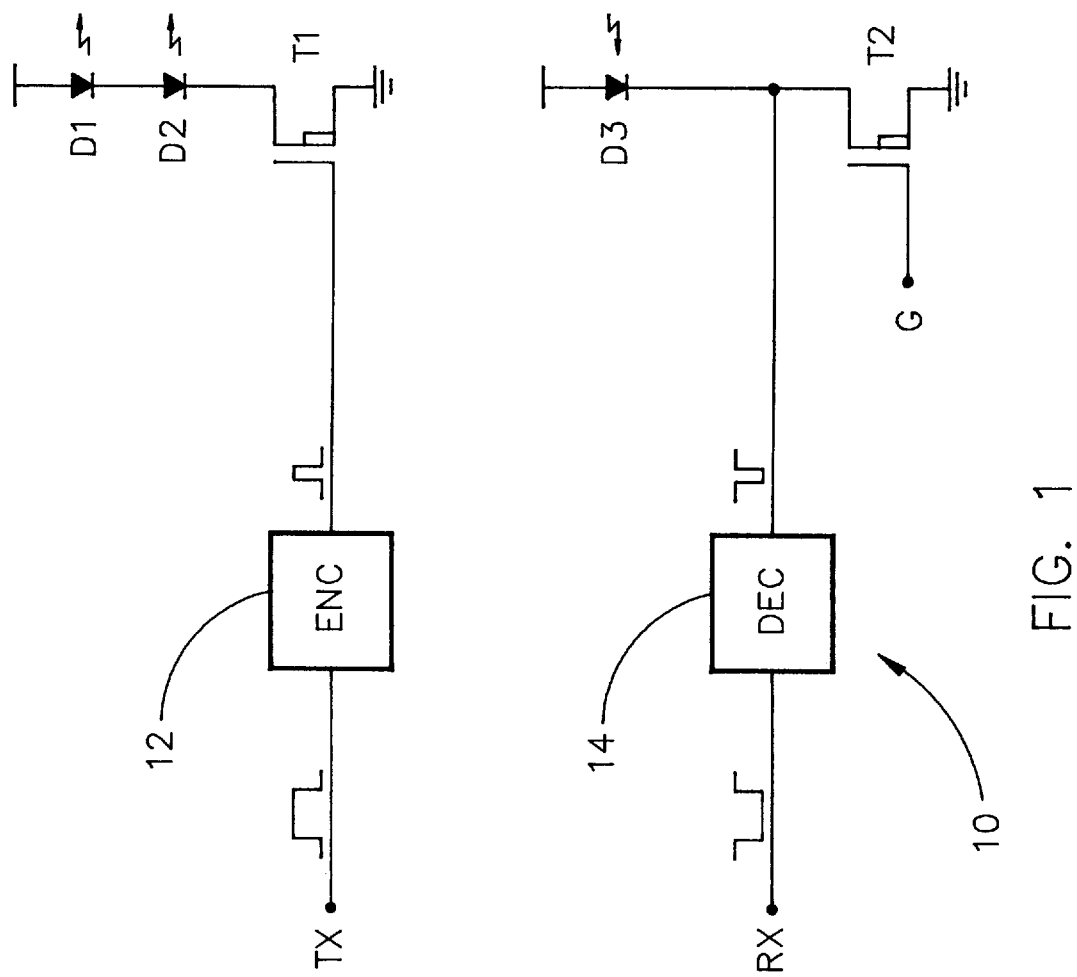
FIG. 1 illustrates a typical infrared data transceiver system which includes a transmitter and a receiver.

FIG. 1 depicts a typical infrared data transceiver system 10. The hardware of the infrared data transceiver 10 typically includes an encoder ("ENC") 12 which may receive the data signal to be transmitted TX from a universal asynchronous receiver/transmitter (UART) device (not shown), for example. A UART may be used, for example, to provide all of the interface functions necessary for the system processor of the data terminal in which the infrared transceiver 10 is utilized to communicate with the infrared transceiver 10 as a serial device.

The output of the encoder 12 may send an encoded data signal to a transistor T1 which is preferably a p-channel metal-oxide-semiconductor field-effect transistor (MOSFET), although any other equivalent control device may be utilized as well. The transistor T1 preferably is connected in series with and controls the current flowing through infrared light emitting diodes D1 and D2 in response to the encoded data signal to be transmitted by the diodes D1 and D2 via infrared transmission. Alternatively, the present invention may utilize other infrared transducer elements in lieu of infrared diodes D1 and D2 such as phototransistors, for example.

Infrared data may be received and transduced from an infrared signal into an electrical signal, preferably with an infrared photodiode D3 which controls the current flowing through transistor T2, preferably a p-channel MOSFET transistor. Alternatively, the present invention may utilize other infrared transducer elements in lieu of infrared diode D3 such as a photo transistor, for example. The infrared photodiode D3 is preferably reverse-biased and connected in series with the transistor T2. The received data signal may be fed into a decoder ("DEC") 14 which decodes the received data signal encoded according to IrDA standards. An enable control G at the gate of the transistor T2 is used to turn on the transistor T2 to allow current to flow therethrough such that the infrared photodiode D3 is able to receive infrared data.

Data communications with the infrared data transceiver 10 preferably implement the IrDA standard promulgated by the Infrared Developers Association, which currently has more than 90 vendor-members. In the IrDA standard, a UART provides an asynchronous character stream wherein one data frame is defined as comprising a start bit, eight data bits and a stop bit. The bits are encoded such that a low assertion corresponds to a logical one and a high assertion corresponds to a logical zero. Half-duplex communication is frequently utilized to prevent the receiving photodiode from receiving direct transmissions from the transmitting infrared LEDs.

The pulse widths of the data stream bits are set to a maximum of $3/16$ of the width of the bit rate period with the IrDA standard. Pulse widths are compressed before transmission in order to reduce the power consumption of the transmitter infrared LEDs. Likewise, the pulse widths of the received data stream are decompressed after reception in order to robustly recover the data encoded in the data stream.

As shown in FIG. 1, the pulses of a data stream pulse to be transmitted TX is compressed to $3/16$ of its period after being encoded according to the IrDA standard and before being transmitted by the infrared LEDs D1 and D2. Likewise, a data pulse received by the infrared photodiode D3 is decompressed to $16/3$ of its width by the decoder 14 before being sent to a UART as received data stream RX.

An artifact of infrared data communications is the unintended receiving at the infrared photodiode D3 of an echo of an infrared signal transmitted from the infrared LEDs D1 and D2 of the same infrared transceiver 10 even when half-duplex transmission is utilized. A byte transmitted from infrared diodes D1 and D2 may be received by infrared photodiode D3 thereby causing an interruption of the data reception process.

The interrupt is normally required to be serviced, or managed, in order to determine whether the received byte was the same as the byte of data that was recently transmitted. If the byte was recently transmitted then that byte is ignored and discarded. This interrupt process is tedious, expends processing power and often cannot discriminate between an echo of a transmitted signal and a genuine data signal.

Figure 2:
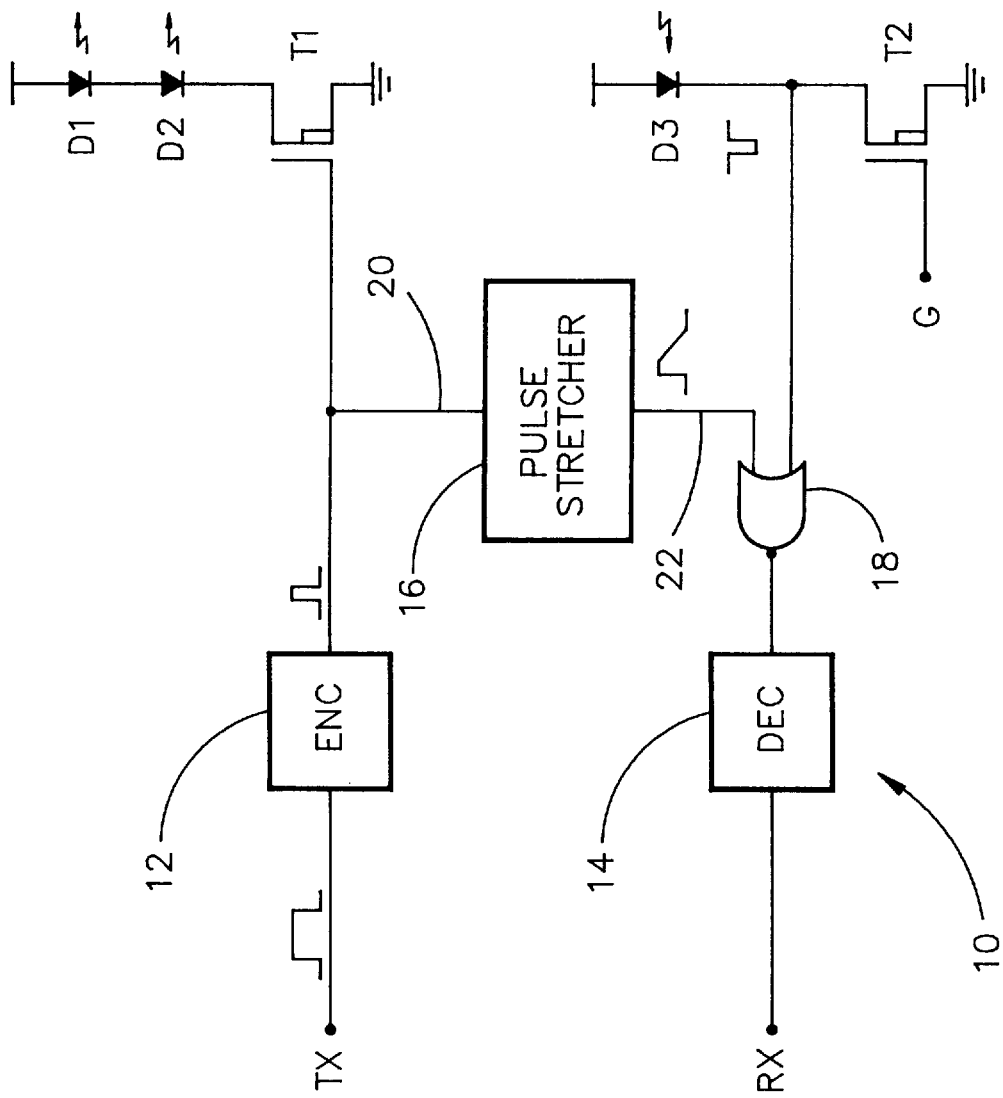
FIG. 2 depicts an infrared data transceiver including circuitry for implementing echo cancellation.

FIG. 2 is an illustration of a circuit for canceling the echo in an infrared transceiver 10. A pulse stretcher circuit ("PULSE STRETCHER") 16 having an input terminal 20 and an output terminal 22 preferably connects between the encoded data signal path and the received data signal path. The pulse stretcher 16 may be utilized to stretch the periods of the IrDA encoded stream of data pulses to be transmitted so that the stretched pulses may be combined to be with the IrDA encoded stream of data pulses received by the infrared photodiode D3. The pulse stretched transmitted data stream pulses are preferably combined with the received data stream signal with a NOR gate 18. A NOR gate 18 is preferably utilized to combine the data signals because a NOR gate has an output which is the complement of the output of an AND gate and because a low valued pulse corresponds to a logical one and a high valued pulse corresponds to a logical zero in the IrDA standard.

With the configuration of the infrared transceiver 10 as illustrated in FIG. 2, the pulse stretcher circuit 16 subtractively combines a version of the transmitted data signal with the data signal received by infrared photodiode D3. A version of the transmitted data signal may be defined as a signal tapped off of the transmitted data signal line which may be utilized for signal processing and conditioning. Any data signal transmitted by infrared diodes D1 and D2 subsequently received as an echo by infrared photodiode D3, wherein the echo is superimposed upon the received data signal, may be thereby effectively removed from the received data signal before being decoded and processed.

The pulse stretcher circuit 16 increases the period of the narrow $3/16$ IrDA standard width pulses to ensure that the period of the canceling pulses is greater than the period of the echo pulses to be canceled from the received data signal. Thus, stretching the period (or width) of the canceling signal pulses allows for a margin of error in the phase difference between the canceling signal and the echo signals to be canceled. The phase difference between the two signals may result from, for example, a varying delay time of the echo signal which is a function of the distance of the infrared transceiver 10 from the surface off of which the transmitted signal is reflected. Thus, pulse stretching of the canceling signal effectively increases the range of echo signal propagation delay times over which the echo signal may be effectively canceled.

Figure 3:
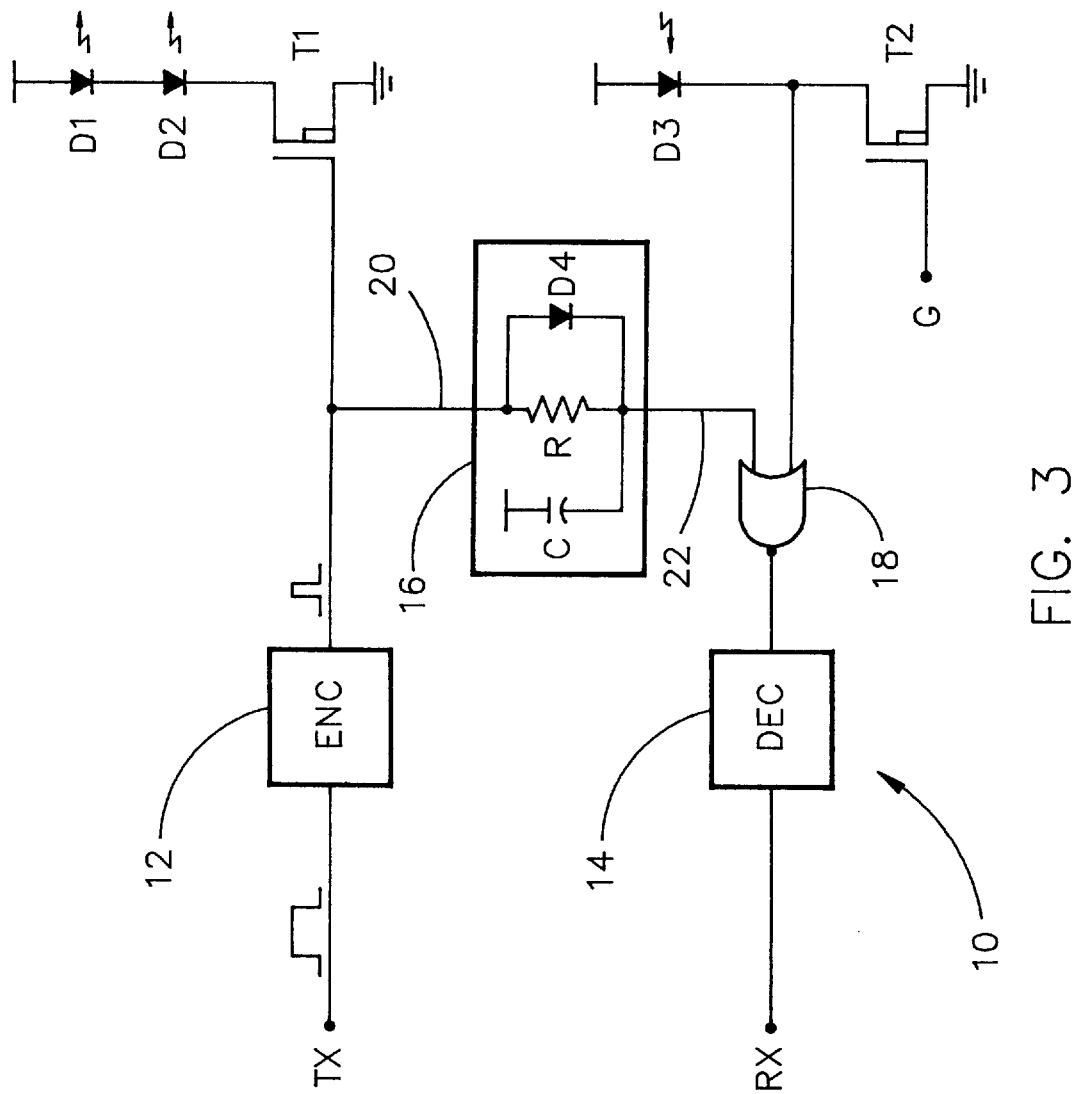
FIG. 3 illustrates an infrared transceiver having echo cancellation circuitry further showing an exemplary embodiment of a pulse stretcher circuit.

FIG. 3 is an illustration of an exemplary embodiment of the present invention showing a preferred pulse stretcher circuit. A pulse stretcher circuit 16 preferably comprises a capacitor C, a resistor R and a diode D4. The relatively slow natural response of the RC circuit formed by resistor R and capacitor C is utilized to perform the stretching of echo canceling pulses. The relatively rapid step response of the RC circuit formed by the on resistance of diode D4 and capacitor C is used to bypass resistor R and to quickly respond to the input of echo canceling pulses. The circuit arrangement of the pulse stretcher 16 preferably stretches in time the falling edge of an input echo canceling pulse signal and immediately responds to the rising edge of an input echo canceling pulse signal. In this manner of operation, the immediate response of the pulse stretcher circuit 16 allows for canceling of echos of the transmitted signal having short delay times while the relatively slow response time of the pulse stretcher circuit 16 allows for canceling of echos of the transmitted signal having relatively long delay times.

If the pulse stretcher circuit 16 were not immediately responsive to the rising edge of a transmitted pulse, the pulse stretcher 16 would not produce an echo canceling signal before an echo signal is received and decoded by the decoder 14. The pulse stretcher 16 stretches the later occurring in time falling edge of the echo canceling signal in order to ensure that the duration of the canceling signal is sufficiently long to cancel received echo signals having relatively longer delay times, e.g. signals reflected from far away surfaces. In an exemplary embodiment of the present invention, capacitor C has a capacitance value of 1 nF and resistor R has a resistance value of 10 kΩ. The on resistance of diode D4 is typically on the order of 100 Ω.

Figure 4:
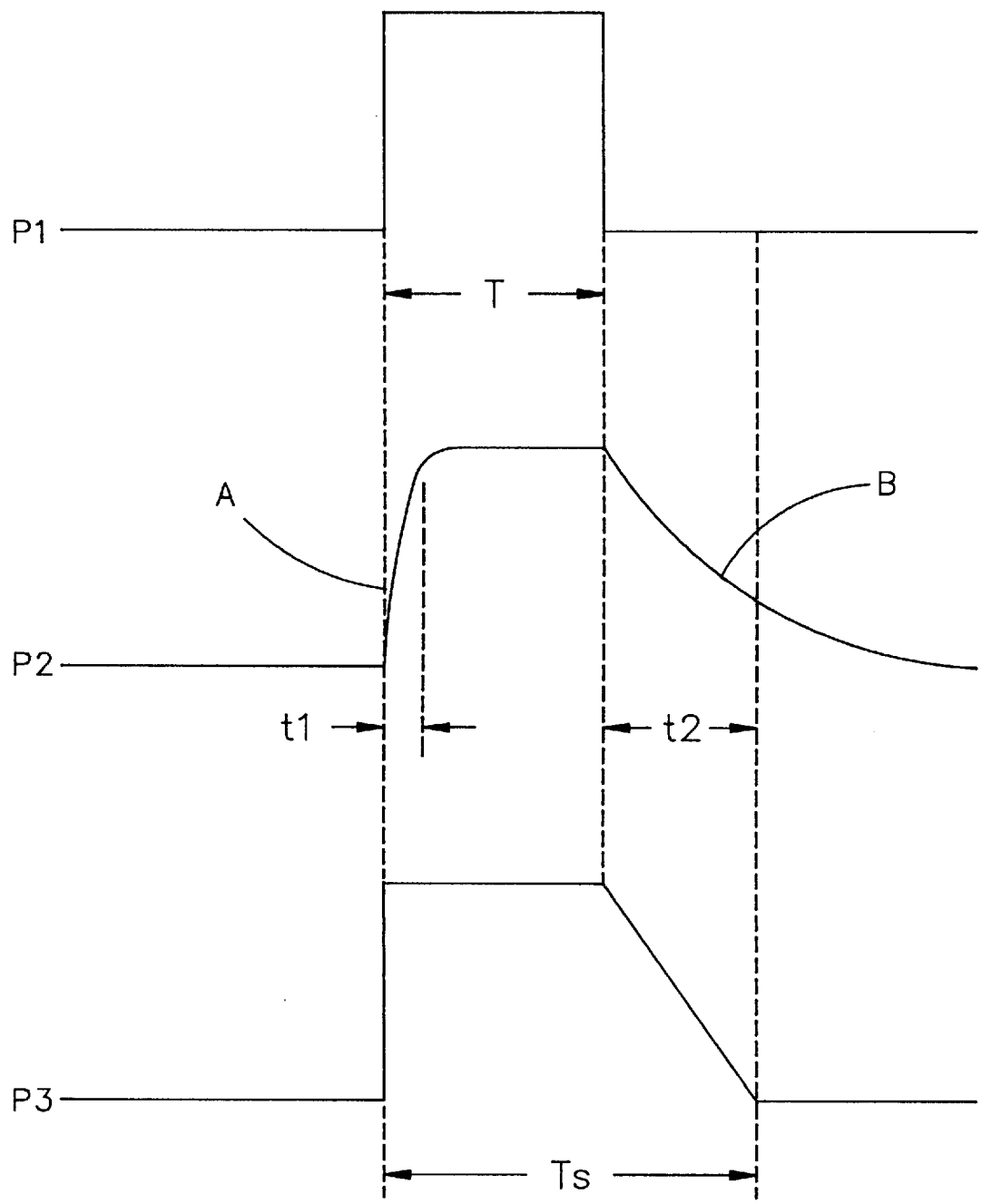
FIG. 4 is a timing diagram showing the effect of a pulse stretcher circuit of the present invention upon an echo canceling input pulse signal.
Figure 5A:
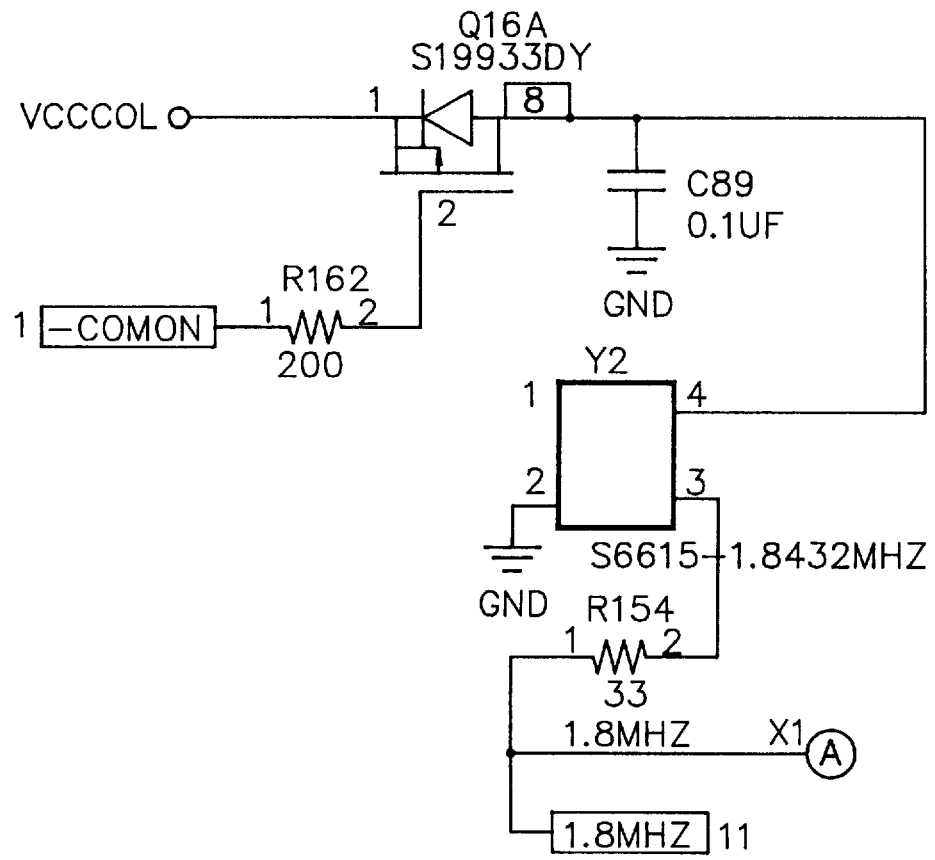
FIG. 5 is a schematic diagram of the infrared echo canceling circuit of the present invention utilized in a portable data terminal.
Figure 5B:
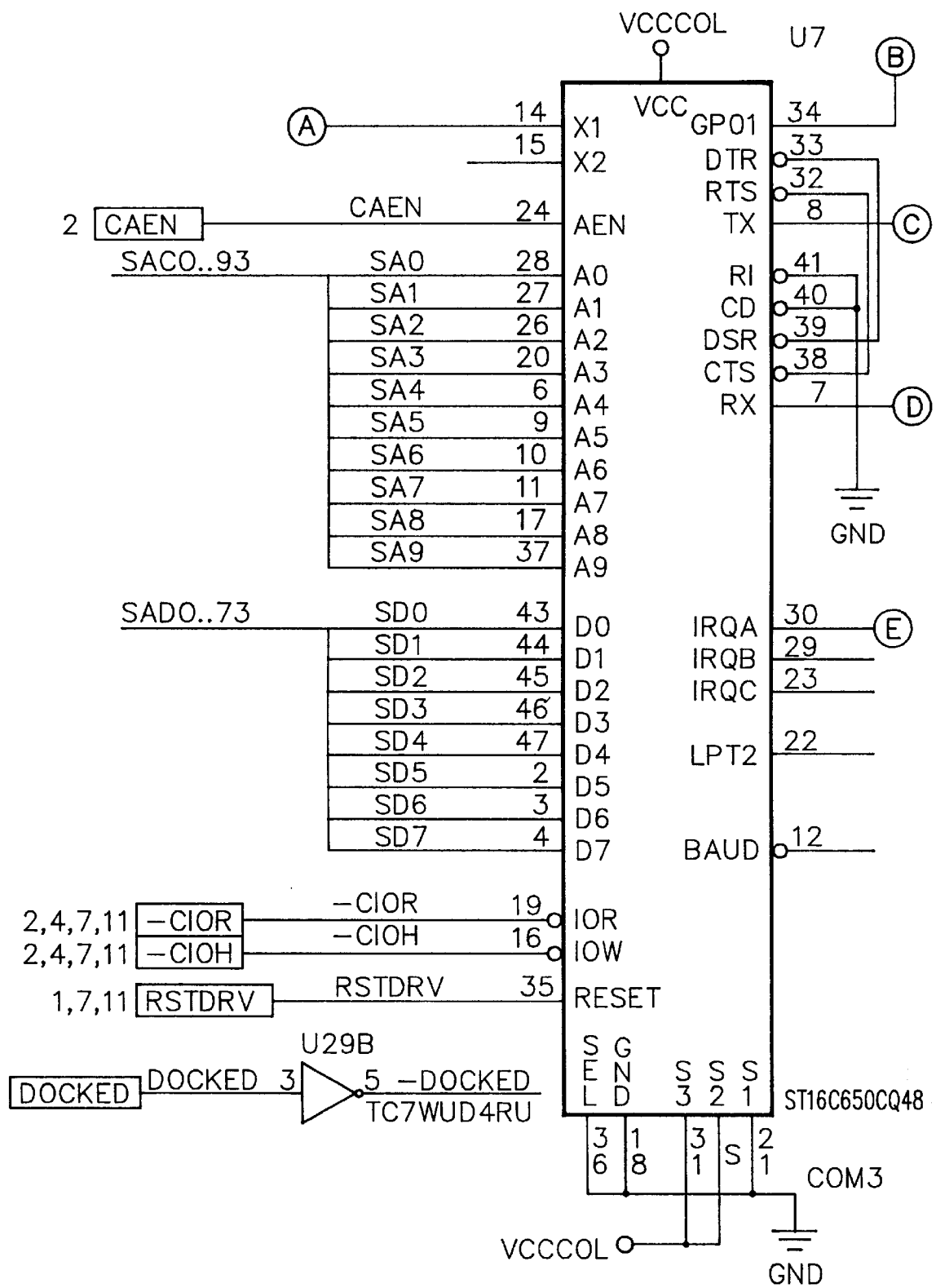
Figure 5C:
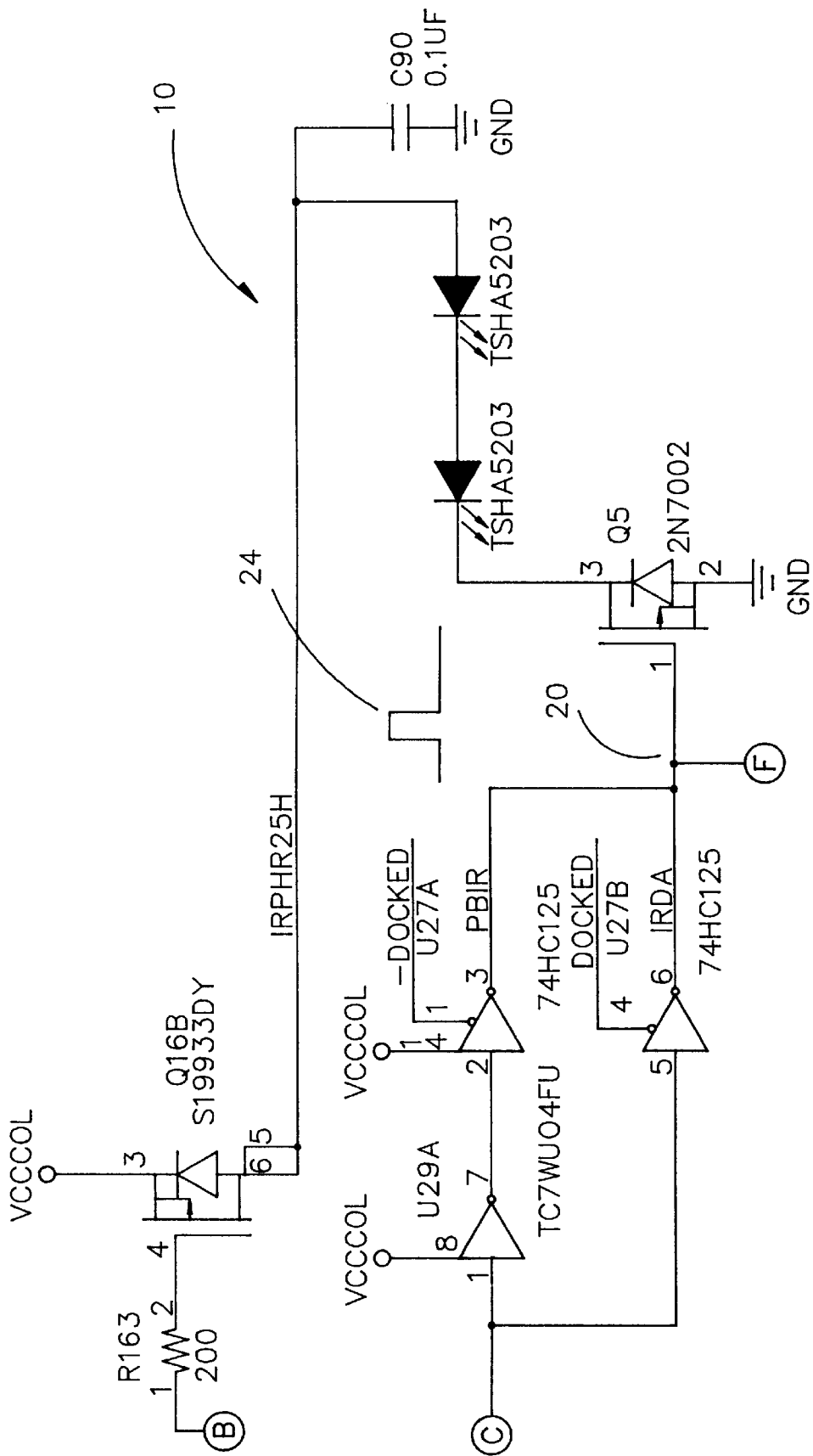
Figure 5D:
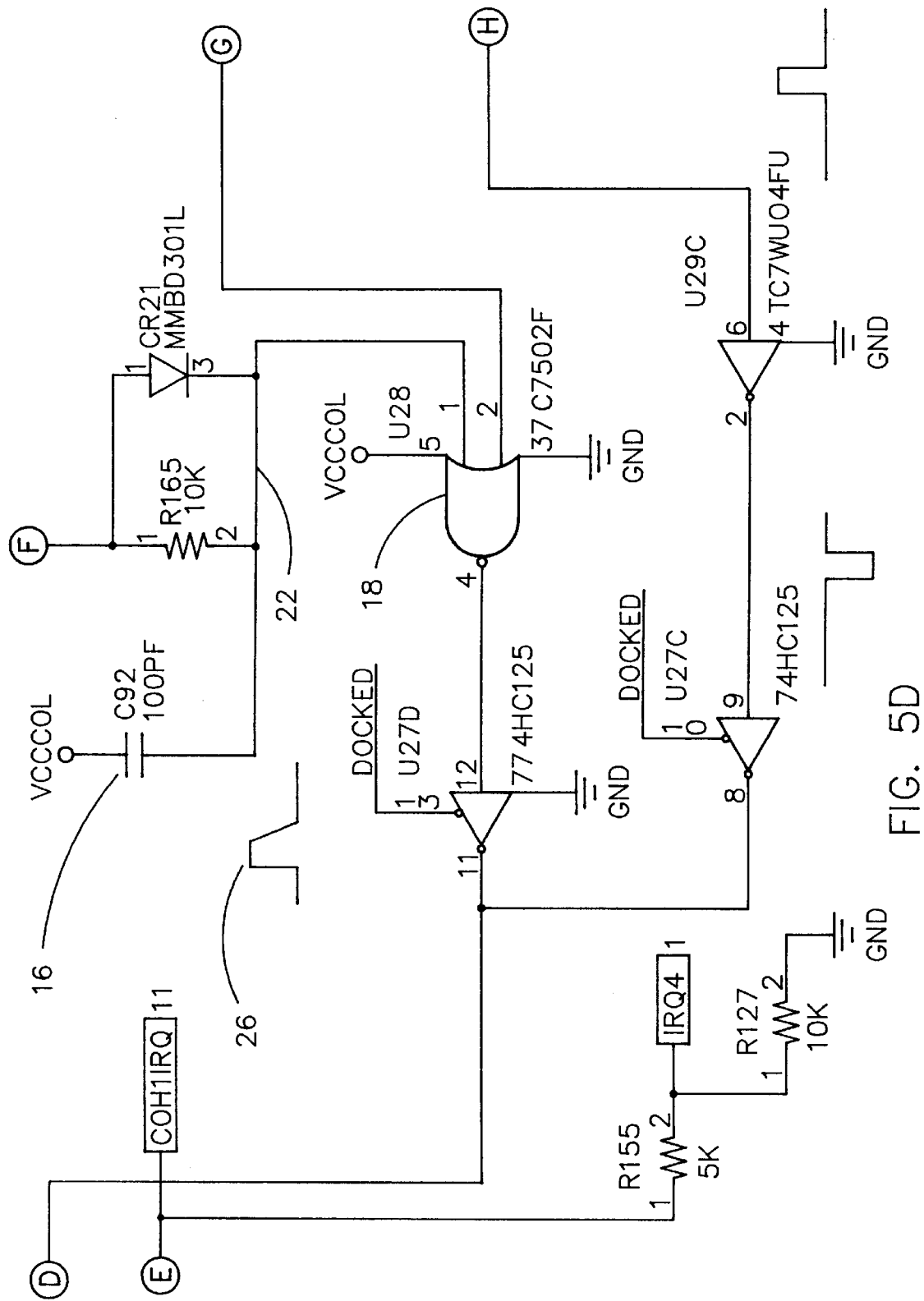
Figure 5E:
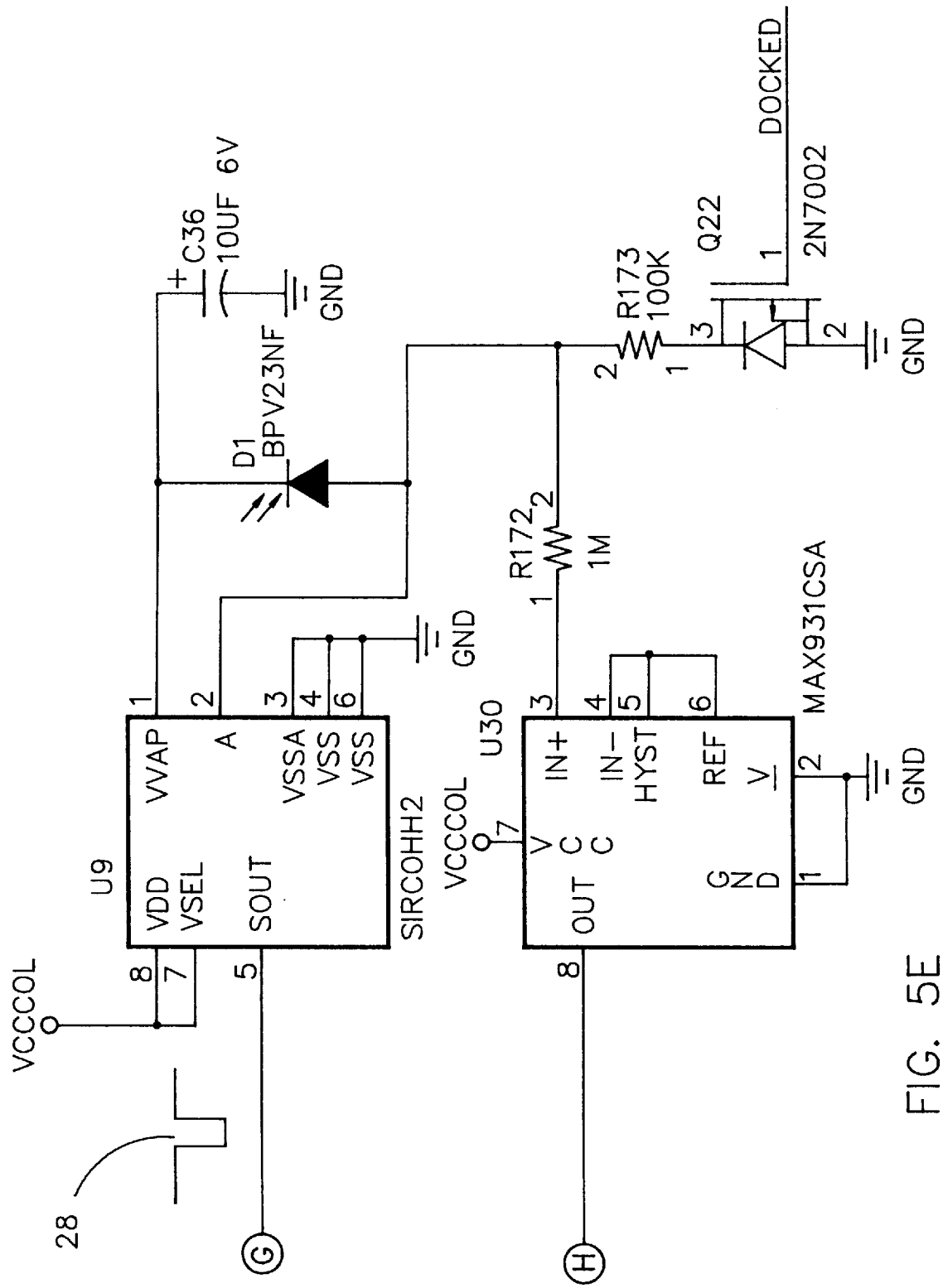

FIG. 4 is a timing diagram illustrating the effect of the pulse stretching circuit of the present invention on echo canceling data pulses. A pulse signal to be stretched, designated as P1, generally may have a period or pulse duration of T seconds. The IrDA standard currently directs data rates to be a maximum of 115.2 kbps (kilobits per second) which corresponds to a minimum data pulse width of approximately 8 µs.

Referring to FIG. 3, when a pulse signal P1 appears at the input terminal 20 of the pulse stretcher 16, diode D4 is forward biased and current flows into capacitor C through diode D4. The on resistance of a diode is typically on the order of 100 Ω, much smaller than the value of resistor R which preferably has a value of 10 kΩ in an exemplary embodiment. Alternative embodiments of the present invention may encompass various values of resistor R, capacitor C and diode D4 in order to accommodate varying data pulse widths due to different IrDA transmission rates, for example. Thus, when diode D4 is forward biased, resistor R and diode D4 form a current divider circuit wherein essentially all of the current (99 percent) flows through the branch comprising diode D4.

The resulting pulse signal appearing at the output terminal 22 of the pulse stretcher 16 may be generally represented by pulse P2. The effect of the pulse stretcher circuit 16 on the rising edge of an input pulse signal P1 is governed by the step response of an RC circuit. The step response of an RC may be mathematically described as:

$$v(t) = V_s - V_s * e^{-t/RC}$$

wherein v(t) is the voltage output of the RC circuit, Vs is the step or pulse voltage applied to the RC circuit, C is the effective capacitance value, R is the effective resistance value and the product RC is the time constant of the circuit.

As can be seen from the leading edge A of the pulse P2 in FIG. 4, the pulse stretcher circuit 16 responds to the input pulse P1 according to the step response of the RC circuit formed by capacitor C and the on resistance of diode D4. Because essentially all of the current is flowing through diode D4 due to the leading edge of an input pulse P1, the time constant RC of the pulse stretcher 16 is the product of the capacitor value C and the on resistance of diode D4 and is equal to time t1. Time constant value t1 is the amount of time required for the voltage at the output terminal 22 of the pulse stretcher 16 to reach 63 percent of its final value $V_s$.

In an exemplary embodiment of the present invention the step response time constant t1 of the pulse stretcher 16 for a leading edge of an input echo canceling pulse P1 is 100 ns. With current pulse widths of 8 µs for maximum IrDA data rates, the response time t1 of the pulse stretcher 16 to the leading edge of an input echo canceling pulse P1 is preferably approximately one tenth or less of the period T of an input pulse P1. Thus the pulse stretcher 16 preferably rapidly responds to the rising edge of an input echo canceling pulse P1 appearing at its input terminal 20.

When a falling edge appears at the end of the period T of an input pulse P1, capacitor C will discharge current and diode D4 will be reverse biased. Current will flow through resistor R and no current will flow through reverse biased diode D4. Thus the pulse stretcher 16 will preferably produce a signal P2 having a falling edge output B in response to the falling edge of an input pulse P1. The falling edge output B of the pulse stretcher 16 exhibits the natural response of an RC circuit formed by resistor R and capacitor C and is generally described as:

$$v(t) = V_s * e^{-t/RC}$$

wherein v(t) is the output voltage of the RC circuit as a function of time, $V_s$ is the initial voltage applied to the RC circuit to which the effective capacitance C is charged, R is the effective resistance and the product RC is the time constant of the circuit.

As can be seen from the falling edge B of the pulse P2 in FIG. 4, capacitor C discharges through resistor R according to the natural response of an RC circuit. Because of the larger time constant RC due to the value of resistor R, the output appearing at output terminal 22 of the pulse stretcher 16 responds much slower than the falling edge of an echo canceling pulse signal P1 appearing at the input terminal 20 of the pulse stretcher 16 resulting in an effective increase in fall time of t2 seconds of the output pulse P2. Time constant value t2 is the amount of time required for the voltage at the output terminal 22 of the pulse stretcher 16 to reach 37 percent of its initial value $V_s$. A pulse signal P1 appearing at the input 20 of the pulse stretcher 16 is thereby stretched in time and appears at the output terminal 22 of the pulse stretcher 16 as pulse signal P2.

In an exemplary embodiment of the present invention, the time constant t2 of the pulse stretcher 16 in response to a falling edge of an input echo canceling pulse P1 due to natural response of the RC circuit comprising capacitor C and resistor R is approximately 10 µs. Thus, the pulse stretcher 16 preferably effectively doubles the pulse width of input echo canceling pulse P1 having a period T of 8 µs when the infrared transceiver 10 transmits at the IrDA maximum data rate of 115.2 kbps.

If diode D4 of FIG. 3 were not used to charge the capacitor C and the capacitor C were merely charged through the resistor R, then the response time t1 of the pulse stretcher 16 in response to the leading edge of an input pulse P1 would be equal to the response time t2 of the pulse stretcher 16 in response to the falling edge of the input pulse P1. In such a case output pulse P2 would be merely a delayed and naturally distorted version of the input pulse P1. Thus, no pulse stretching would thereby occur.

The ideal or effective output of the pulse stretcher 16 may be represented as pulse signal P3. Output pulse P3 effectively immediately responds to the leading edge of an input pulse P1 to be transmitted by diodes D1 and D2 in order to guarantee that the pulse stretcher 16 may cancel shorter echos of the transmitted signal received by photodiode D3. Thus, the response time t1 of output signal P2 of the pulse stretcher 16 to the leading edge of an input pulse signal P1 preferably approaches zero, as exhibited by output pulse P3, in order to cancel shorter echo delay times of the transmitted signal P1.

Output pulse P3 slowly responds to the falling edge of an input signal P1 which is transmitted in order to guarantee that the pulse stretcher 16 may effectively cancel longer echos of the transmitted signal P1 received by photodiode D3. Thus, the response time t2 of output signal P2 of the pulse stretcher to 16 the falling edge of an input pulse signal P1 is effectively increased in a manner as generally exhibited by output pulse P3. Pulse P3 shows a straight line approximation wherein the period T of the input pulse P1 is increased, as exhibited by output pulse P3, approximately by time t2 equal to the time constant of the RC circuit formed by resistor R and capacitor C. The resulting output pulse P3 has an effective stretched pulse width of Ts which is essentially equal to the pulse width T of an input pulse P1 plus the falling edge time constant t2.

When the echo canceling apparatus and method of the present invention are employed any echo signals transmitted by the infrared transceiver 10 are effectively canceled and removed from the received data signal. Because the artifact of infrared echo interference is removed by utilization of the present invention, full duplex infrared data transmissions may be employed. Full duplex operation at the same data rate and the same transmission frequency for both the transmitter and the receiver may be employed without concern for or the need for servicing data interrupts because the canceling of echo signals eliminates a primary cause of data interrupts.

FIG. 5 illustrates schematically the utilization of the infrared echo canceling apparatus of the present invention in a hand-held portable data terminal. The hand-held portable data terminal may integrate the infrared echo canceling circuit with an infrared communications system for direct line of sight wireless communications such as printing and file transferring.

As shown in FIG. 5, photodiodes D2 and D3 operate to transmit infrared data signals by transducing an electrical signal into an infrared signal. Transistor Q5 operates as a control switch by controlling the signal transmitted by diodes D2 and D3. Photodiode D1 operates to receive infrared data signals by transducing received infrared data signals into an electrical signal. The operation of diode D1 is controlled by transistor Q22.

In operation of the transceiver 10 as shown in FIG. 5, an electrical pulse signal 24 is fed to transistor Q5 activating diodes D2 and D3 whereby the pulse is transmitted as an infrared signal. The electrical pulse signal 24 is tapped off at node 20 to be fed into the pulse stretcher circuit 16 comprising capacitor C92, resistor R165 and diode CR21. The output of the pulse stretcher 16 at node 22 is a stretched version 26 of the electrical pulse signal 24, which is fed as an input into nor gate 18. In reference to FIG. 4, it can bee seen that the trailing edge of the pulse signal 24 is stretched" in time due to the response of the pulse stretcher circuit 16 while the leading edge of the pulse is essentially unaffected. The resultant output pulse 26 may be represented by the linear approximation of the pulse P3 as shown in FIG. 4. The received pulse signal 28 is also fed as input into nor gate 18 for cancellation of the reflections, or echos, of the transmitted electrical signal 24 which may be subsequently inadvertently received by diode D1.

In view of the above detailed description of a preferred embodiment and modifications thereof, various other modifications will now become apparent to those skilled in the art. The claims below encompass the disclosed embodiments and all reasonable modifications and variations without departing from the spirit and scope of the invention.

What is claimed is:

1. An infrared data communications system comprising:
   (a) an infrared data communications transceiver for transmitting and receiving infrared data signals;
   (b) an infrared data signal echo canceling system operatively integrated with said data communications transceiver for canceling reflections of the infrared data signals transmitted by said infrared data communications transceiver which are subsequently received by said infrared data communications transceiver, said infrared data signal echo canceling system including a pulse stretcher for increasing the pulse width of a version of the transmitted data signals for producing a pulse stretched version of the transmitted data signals; and
   (c) means for subtractively combining the pulse stretched version of the transmitted infrared data signals with the received infrared data signals such that the reflections of the transmitted infrared data signals subsequently received by said infrared data communications transceiver are removed from the received infrared data communications signal.

2. The infrared data signal echo canceling system of claim 1 wherein said pulse stretcher operatively accomodates any delay time between the transmission of the transmitted infrared data signals and the subsequent reception of reflections thereof by said infrared data communications transceiver.

3. The infrared data communications system of claim 1 wherein said pulse stretcher operatively accomodates any multipath reflections between the transmission of the transmitted infrared data signals and the subsequent reception of reflections thereof by said infrared data communications transceiver.

4. The infrared data communications system of claim 1 wherein said infrared data communication transceiver operated according to IRDA standards.

5. An infrared echo canceling data communications system comprising:
   (a) an infrared data encoder having an input and an output;
   (b) an infrared data decoder having an input and an output;
   (c) a first infrared signal transducer connected to and receiving the output of said infrared data encoder for transmitting the output of said infrared data encoder as infrared data transmissions;
   (d) a second infrared signal transducer connected to the input of said infrared data decoder for receiving infrared data transmissions; and
   (e) means connected between the output of said infrared data encoder and the input of said infrared data decoder for canceling echo signals of said first infrared data transducer received by said second infrared data transducer wherein said echo canceling means comprises a pulse stretcher having an input connected to and receiving the output of said infrared data encoder and an output and means connected between the input of said infrared data decoder and said second infrared data transducer for combining the output of said pulse stretcher with the infrared data transmissions received by said second infrared data transducer.

6. The infrared echo canceling data communications system of claim 5 wherein said pulse stretcher comprises:
   (a) a diode having an anode and a cathode, said anode comprising an input node of said pulse stretcher, said cathode comprising an output node of said pulse stretcher;
   (b) a resistor electrically connected in parallel with said diode; and
   (c) a capacitor electrically connected in series with said diode at the cathode of said diode.

7. The infrared echo canceling data communications system of claim 5 wherein said means for combining the output of said pulse stretcher with the infrared data transmissions received by said second infrared data transducer comprises a nor gate.

8. A process of canceling received infrared echo signals in an infrared data communications system comprising:
   (a) transmitting a stream of data pulses with an infrared transmitter;
   (b) receiving a stream of data pulses with an infrared receiver;
   (c) stretching the pulse width of a version of the transmitted stream of data pulses; and
   (d) subtractively combining the pulse stretched version of the transmitted stream of data pulses whereby echo signals of the transmitted stream of data pulses received by the infrared receiver are canceled from the received stream of data pulses.

* * * * *